United States Patent [19]

Kase et al.

[11] Patent Number: 4,521,950

[45] Date of Patent: Jun. 11, 1985

[54] AUTOMATIC TOOL CHANGE MACHINE TOOL

[75] Inventors: Hiroshi Kase, Takatsuki; Yoshiaki Matsumoto, Mino; Kouji Ohkawa, Toyonaka, all of Japan

[73] Assignee: O-M Limited, Osaka, Japan

[21] Appl. No.: 403,543

[22] Filed: Jul. 30, 1982

[30] Foreign Application Priority Data

Aug. 13, 1981 [JP] Japan ............................ 56-127347[U]
Aug. 13, 1981 [JP] Japan ................................ 56-120741

[51] Int. Cl.³ ............................................ B23Q 3/157
[52] U.S. Cl. ........................................ 29/568; 408/35; 211/1.5; 82/2 D
[58] Field of Search ................. 29/26 A, 568; 408/35; 409/232, 233, 234; 211/1.5; 279/1 A, 41 R; 82/2 D

[56] References Cited

U.S. PATENT DOCUMENTS

| 3,074,147 | 1/1963 | Miller et al. | 408/35 |
| 3,132,551 | 5/1964 | Westerlind | 279/41 |
| 3,191,260 | 6/1965 | Jorgensen | 29/568 |
| 3,277,569 | 10/1966 | Verhoeven | 29/568 |
| 3,413,702 | 12/1968 | Burg | 408/35 |
| 3,601,886 | 8/1971 | Gohren et al. | 29/568 |
| 3,662,442 | 5/1972 | Noa | 82/2 D |
| 4,103,405 | 8/1978 | Blum et al. | 29/568 |
| 4,309,809 | 1/1982 | Yokoe et al. | 29/26 A |
| 4,419,797 | 12/1983 | Sigloch et al. | 29/26 A |
| 4,419,807 | 12/1983 | Moulin | 29/568 |

FOREIGN PATENT DOCUMENTS

| 2719114 | 11/1978 | Fed. Rep. of Germany | 29/568 |
| 2057928 | 4/1981 | United Kingdom | 29/568 |

*Primary Examiner*—Gil Weidenfeld
*Assistant Examiner*—Daniel W. Howell
*Attorney, Agent, or Firm*—Burgess, Ryan and Wayne

[57] ABSTRACT

An automatic tool change machine tool having a vertical column on which a tool stock receiving therein a vertically movable tool bar is mounted. The tool bar is provided with a toolholder receiving means at the lowermost end for the attachment of a toolholder having a cutting tool. The machine tool further has a toolholder magazine storing a plurality of toolholders. The magazine is turned around the vertical column so that one of the toolholders is indexed to a predetermined position where toolholders are attached to and detached from the tool bar in one reciprocal vertical movement of the tool bar.

16 Claims, 7 Drawing Figures

AUTOMATIC TOOL CHANGE MACHINE TOOL

FIELD OF THE INVENTION

The present invention relates to an automatically operated machine tool with an automatic tool changer. More particularly, the present invention relates an automatic tool change machine tool of the type wherein a magazine for storing a plurality of toolholders each having a cutting tool is rotated around a vertical column to index the toolholders to a predetermined position for exchange with a toolholder held by a tool bar mounted on the vertical column by one reciprocal vertical movement of the tool bar.

BACKGROUND OF THE INVENTION

A typical example of a conventional automatic tool change machine tool having a vertical column and a toolholder magazine is disclosed in the copending Japanese Utility Model Application No. 55-189828, filed on Dec. 27, 1980. In the conventional machine tool, a magazine in the shape of an annular plate storing a plurality of toolholders in receptacles is arranged on the side of the vertical column. A vertically movable tool bar is received in a saddle. The saddle is mounted so as to be laterally movable on a crossrail vertically movable along vertical guides formed in the front face of the vertical column. When a toolholder holding a cutting tool and attached to the tool bar is exchanged for a different toolholder stored in the magazine, the saddle together with the tool bar have to be first moved in the lateral direction along the crossrail until they come adjacent to the magazine. The exchange operation is then effected by vertical movements of the tool bar in the saddle. After completion of the exchange operation, the saddle along with the tool bar to which the new toolholder is attached have to be returned to the working position. Accordingly, a long time is taken for each exchange operation and the exchange mechanism is rather complex.

SUMMARY OF THE INVENTION

An object of the invention is to provide a novel construction of an automatic tool change machine tool able to effect exchange operations in a short time.

Another object of the invention is to provide a simple construction of an exchange mechanism of an automatic tool change machine tool having a vertical volumn on which a saddle receiving therein a vertically movable tool bar is mounted.

In accordance with the present invention; there is provided an automatic tool change machine tool. The machine tool comprises a machine bed and a worktable mounted on the machine bed. A vertical column is mounted on the machine bed and has a tool stock disposed at an upper part of the vertical column. A tool bar is received in the tool stock so as to be moved vertically and has at a lower part thereof means for receiving a toolholder. A draw bar is arranged vertically movably in the tool bar for pulling a toolholder toward and releasing the toolholder from the receiving means of the tool bar. The draw bar has at the lowermost end thereof a toolholder engagement means. A magazine in the shape of an annular plate is mounted on a part of the vertical column so as to be turned around the vertical column in a horizontal plane. The magazine has a plurality of receptacles arranged in the outer circumference thereof. A plurality of toolholder supports are retractably arranged on the receptacles and have a retraction means at an inner base portion thereof. A plurality of toolholders each holding a cutting tool are removably stored in the receptacles of the magazine. Each toolholder has a lateral extension means engageable with the corresponding toolholder support arranged on the receptacle, an upper tapered part capable of being fitted in the toolholder receiving means of the tool bar, and an engagement means capable of being engaged with said toolholder engagement means of the draw bar. An indexing means is provided to index each of the plurality of receptacles of the magazine to a predetermined position where a toolholder is attached to or detached from the toolholder receiving means of the tool bar. An actuating means is attached to the vertical column for actuating the retraction of each toolholder support from the corresponding receptacle and the pushing of each toolholder support onto the corresponding receptacle while the corresponding receptacle is indexed to the predetermined position.

Preferably, the toolholder receiving means comprises a centering ring element and a retaining ring. The centering ring element has inner tapered face complementary with and smaller than the upper tapered part of each of the plurality of the toolholders and has a plurality of slits formed in its wall. The centering ring element is able to clamp each toolholder when each toolholder is attached to the toolholder receiving means of the tool bar. The retaining ring holds the centering ring element at the lowermost part of the tool bar.

The present invention will be made more apparent from the ensuing description of preferred embodiments with reference to the accompanying drawings wherein.

Figure 1:
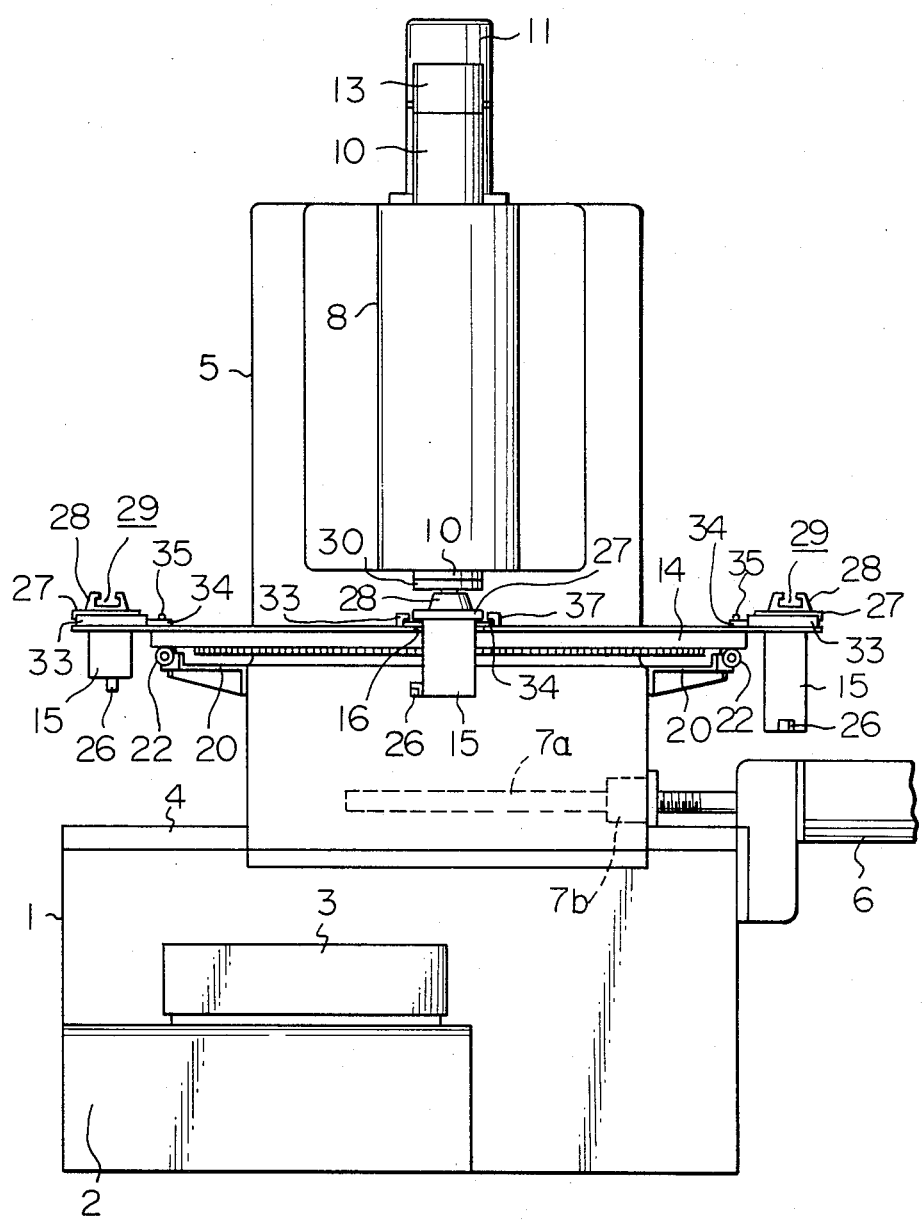
FIG. 1 is a front view of an automatical tool change machine tool according to an embodiment of the present invention.
Figure 2:
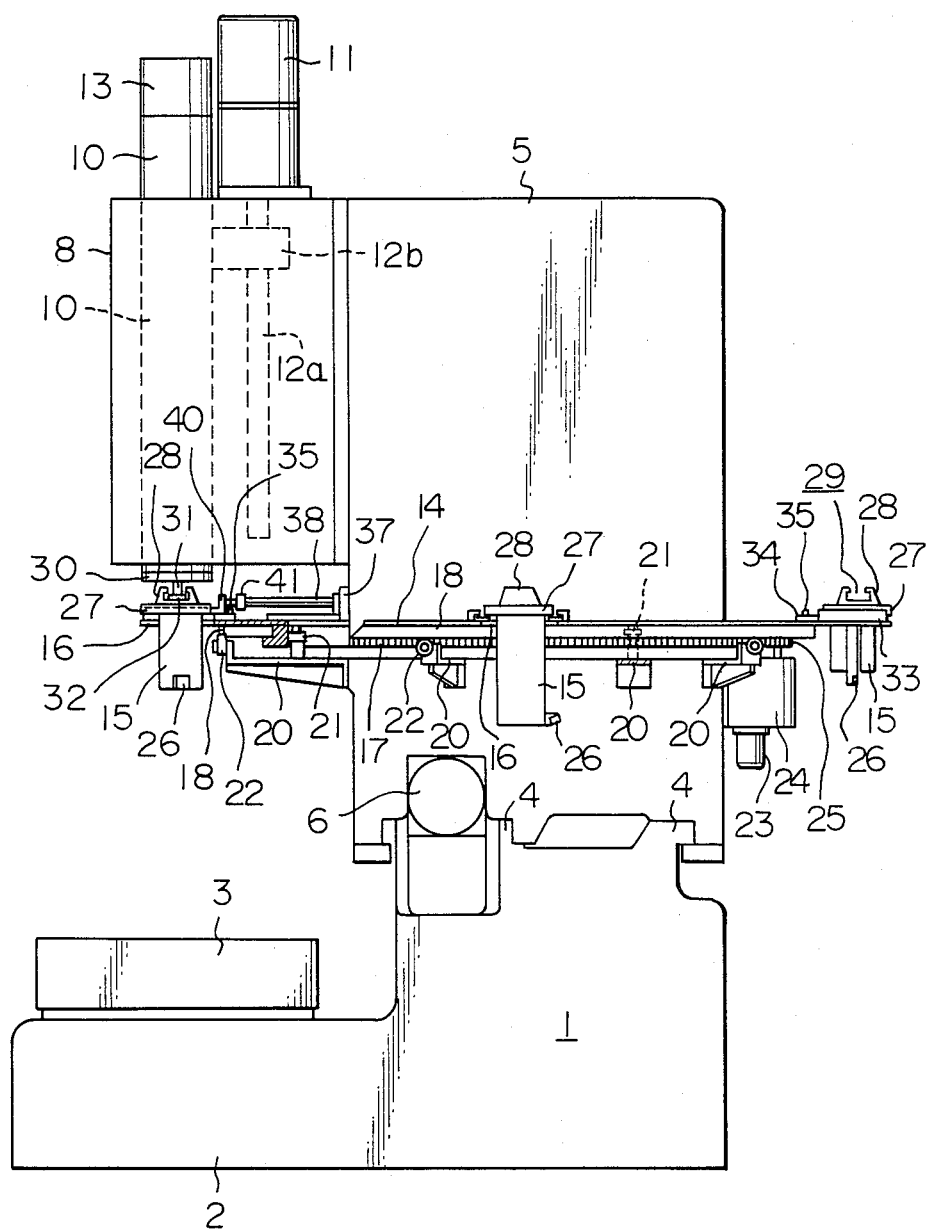
FIG. 2 is a side view of the automatic tool change machine tool of FIG. 1.
Figure 3:
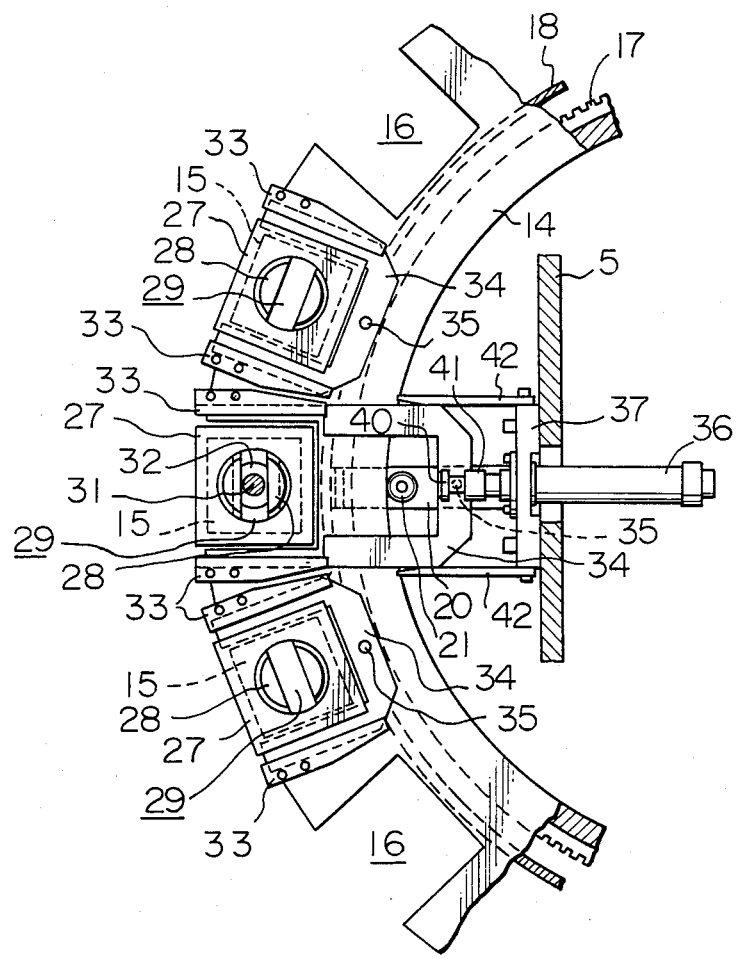
FIG. 3 is an enlarged partial plan view of a magazine provided for the machine tool of FIG. 1.

FIGS. 1 through 3 illustrate an automatic tool change vertical lathe embodying the present invention. The vertical lathe has laterally extending machine bed 1. Machine bed 1 includes low round bed 2 formed as an integral part of a left front portion thereof, and having rotatably mounted on it round rotary table 3, on which workpieces are rested. Machine bed 1 has formed at its top a pair of lateral guides 4 on which a vertical column in the shape of a box is laterally slidably mounted. The lateral sliding of vertical column 5 is driven by drive motor 6 and lateral feed screw 7a engaged with threaded nut 7b fixed to vertical column 5.

Tool stock 8 is fixedly attached to an upper portion of the front face of vertical column 5 and receives therein vertical tool bar 10 having at its lowermost end a tool receiving bore, described later. Tool bar 10 is moved vertically by vertical feed motor 11 and vertical feed screw 12a engaged with threaded nut 12b. Inside vertical tool bar 10, there is provided a vertically extending draw bar (not shown) whose top end is connected to actuating cylinder 13. That is, the draw bar can be moved vertically inside tool bar 10 by the actuation of actuating cylinder 13. The draw bar is used for seating toolholder 15 against the tool receiving bore of tool bar 10 and releasing toolholder 15 from tool bar 10.

Magazine 14, for storing a plurality of toolholders 15, is arranged so as to encircle vertical column 5 at a position below the middle thereof. Magazine 14, which is shaped as a wide annular plate, can be rotated in a horizontal plane around vertical column 5 and is formed with a plurality of quadrilateral receptacles 16 in its outer periphery. Quadrilateral receptacles 16 are provided for receiving a plurality of toolholders 15. Toothed ring 17, with an inverted L-shape cross-section, is attached to the lower face of the inner periphery of magazine 14. Circular rail 18 is attached to the lower face of magazine 14 at a position adjacent to the innermost edges of quadrilateral receptacles 16.

A suitable number of brackets 20 are arranged around and attached to vertical column 5 so as to project therefrom. At the middle of each bracket 20 is disposed support roller 21, rotatable about a vertical axis, so as to contact the circular inner face of toothed ring 17. At the outermost end of each bracket 20 is disposed support roller 22, rotatable about a horizontal axis, so that circular ring 18 rests thereon. That is, support rollers 21 and 22 support magazine 14 so that magazine 14 may accurately and smoothly turn around vertical column 5.

Magazine 14 is turned by drive motor 23 arranged on the back side of vertical column 5. Drive motor 23 drives pinion 25 engaged with toothed ring 17 of magazine 14. Rotation detecting device 24 arranged between drive motor 23 and pinion 25 detects the amount of rotation of pinion 25. Therefore, it is possible to detect the amount of turns of magazine 14 through the amount of rotation of pinion 25. The detecting signals from rotation detecting device 24 are used for controlling the operation of drive motor 23.

As a result, each of receptacles 16 of magazine 14 can be brought to an exact position immediately beneath moved-up tool bar 10. This position will be hereinafter referred to as a "tool change position". Accordingly, any desired toolholder 15 received in the corresponding receptacle 16 of magazine 14 can be indexed to the tool change position.

Each toolholder 15 holding at its lowermost end cutting tool 26 is formed with quadrilateral extension 27 at the top and conical tapered part 28 upwardly extending from the top. The top of conical tapered part 28 is cut to form dovetail groove 29 extending in the circumferential direction of magazine 14 as a female engagement means.

Conical tapered part 28 of each toolholder 15 can be fitted in a tapered bore formed in the inside face of ring 30 attached to the lowermost end of tool bar 10. Cylindrical projection 31 attached to or formed as an integral part with the lowermost end of the draw bar has at the lowermost end thereof circular flange 32 and extends downwardly through ring 30 attached to tool bar 10. The projection 31 and the flange 32 are provided as a male engagement means which can be engaged with the abovementioned female engagement means of each toolholder 15.

At this stage, it should be noted that the shape and dimension of both male and female engagement means of the draw bar and toolholder are designed so that the male engagement means of the draw-bar easily comes into and out of engagement with the female engagement means of each toolholder 15 due to the turning of magazine 14.

A pair of slide guides 33 are arranged on opposite lateral sides of each receptacle 16 of magazine 14. Each slide guide 33 defines a recessed guide groove extending along the corresponding side edge of receptacle 16. Toolholder support 34 in the shape of a fork having parallel prongs is inserted into the pair of slide guides 33 of each receptacle 16. Toolholder support 34 is radially retractable toward the center of magazine 14 by the guide of the pair of slide guides 33. At the center of the base portion of fork-shape toolholder support 34, there is fixed short pin 35 upwardly projecting from the base portion. When toolholder support 34 is inserted into slide guides 33, it is able to support the corresponding toolholder 15 by means of quadrilateral extension 27 of toolholder 15 within the corresponding receptacle 16 of magazine 14. However, when toolholder support 34 is retracted, toolholder 15 is free to pass through the corresponding receptacle 16. That is to say, each toolholder support 34 is used for storing each toolholder 15 within magazine 14.

Actuating cylinder 36 operated by a fluid pressure is attached to the front face of vertical column 5 by means of holding member 37. The body of actuating cylinder 36 is received within the vertical column, as illustrated in FIG. 3. Actuating cylinder 36 is disposed above and adjacent to magazine 14 and has piston rod 38 extendable from and retractable toward the body of actuating cylinder 36 on the radial line which passes through the above-mentioned tool change position. At the outer end of piston rod 38, there are provided two bulged parts 40 and 41 defining therebetween a recess having a radial width larger than the diameter of short pin 35 of each toolholder support 34. On both ends of holding member 37, two guide bars 42, 42 are arranged in parallel with one another for the purpose of guiding each toolholer support 34 when it is retracted by actuating cylinder 36 toward vertical column 5.

When piston rod 38 of actuating cylinder 36 is in the extended position, short pin 35 of each toolholder support 34 can pass through the recess of piston rod 38 during the turning of magazine 14. When one of receptacles 16 of magazine 14 is brought to and stopped at the tool change position, short pin 35 of the corresponding toolholder support 34 is positioned in the recess of piston rod 38. Therefore, at that time, if piston rod 38 is retracted into the body of actuating cylinder 36, bulged part 40 is engaged with short pin 35 and radially inwardly pulls toolholder support 34 until said support 34 comes out of slide guides 33 and 33 guided by two guide bars 42 and 42. Subsequently, if piston rod 38 is extended from the body of actuating cylinder 36, bulged part 41 pushes short pin 35 outwardly. As a result, toolholder support 34 is restored to the inserted position in slide guides 33 and 33.

The operation of the automatically tool changeable machine tool of the above-mentioned embodiment will be described hereinbelow.

Initially, all receptacles 16 of magazine 14 receive toolholders 15 having a cutting tool. That is, toolholders 15 are stored in magazine 14 while resting on toolholder supports 34, which are inserted into slide guides 33 and 33. At this stage, piston rod 38 of actuating cylinder 36 is brought to the most extended position. In order to attach a desired toolholder 15 to tool bar 10, tool bar 10 is moved up to the highest position so that the male engagement means of the draw bar received within tool bar 10 comes immediately above magazine 14. That is, projection 31 having flange 32 is brought to the position illustrated in FIGS. 1 and 2.

Subsequently, drive motor 23 is operated so as to turn magazine 14 around vertical column 5 until the desired toolholder 15 stored in the magazine is indexed to the tool change position immediately beneath tool bar 10. When the desired toolholder 15 is indexed to the tool change position, magazine 14 is automatically stopped by rotation detecting device 24. At this stage, it should be understood that before the desired toolholder 15 is indexed to the tool change position, magazine 14 is smoothly turned around vertical column 5 since projection 31 and flange 32 are shaped and sized so as to easily come into and out of each dovetail groove 29 of each toolholder 15 and also since each short pin 35 of each toolholder support 34 is sized so as to easily pass through the recess of piston rod 38.

When the desired toolholder 15 is indexed to the tool change position, magazine 14 is stopped. The male engagement means (projection 31 and flange 32) of the draw bar is engaged with the female engagement means (dovetail groove 29) of the desired toolholder 15, and short pin 35 of toolholder support 34 supporting the desired toolholder 15 is positioned in the recess of extended piston rod 38 of actuating cylinder 36.

Subsequently, cylinder 13 is operated so as to upwardly move the draw bar. As a result, the desired toolholder 15 is upwardly drawn by the draw bar by means of the engagement of the male and female engagement means, so that conical tapered part 28 of the desired toolholder 15 is fitted in the tapered bore of ring 30 of tool bar 10. Consequently, the desired toolholder 15 is attached to the lowermost end of tool bar 10. Thereafter, actuating cylinder 36 is operated so as to retract piston rod 38. Therefore, toolholder support 34 is pulled away from slide guides 33 and 33 and held between two guides 42 and 42. When toolholder support 34 is pulled away from slide guides 33 and 33, extension 27 of the desired toolholder 15 is now able to freely pass through the corresponding receptacle 16 of magazine 14. Thus, tool bar 10 having the desired toolholder 15 is moved down by drive motor 11 until cutting tool 26 of the desired toolholder 15 is brought to a working position where cutting tool 26 cuts a workpiece on worktable 3.

During the cutting operation of cutting tool 26 of the desired toolholder 15, the lateral feed of cutting tool 26 is accomplished by moving vertical column 5 on the pair of lateral guides 4 of machine bed 1 by drive motor 6. It should be understood that during the cutting operation, magazine 14 is maintained at a stop.

After the completion of the cutting operation, the used toolholder 15 is automatically exchanged for a different desired toolholder 15 in the following manner. In order to return the used toolholder 15 to magazine 14, tool bar 10 together with the used toolholder 15 are moved up by drive motor 11 until the used toolholder 15 is received in empty receptacle 16 of magazine 14. However, extension 27 of toolholder 15 is held above the upper face of magazine 14. Subsequently, actuating cylinder 36 is operated so as to extend piston rod 38. Piston rod 38 pushes toolholder support 34, which has been pulled away from slide guides 33 and 33. Thus, toolholder support 34 is inserted into slide guides 33 and 33 and under toolholder 15 received in receptacle 16 of the magazine. After the insertion of toolholder support 34, the cylinder 13 is operated so as to lower the draw bar. As a result, the used toolholder 15 is detached from tool bar 10 and seated on toolholder support 34. That is, the return of the used toolholder 15 to magazine 14 is completed. Magazine 14 is then turned by motor 23 so that the next desired toolholder 15 is indexed to the tool change position. The indexed toolholder 15 is subsequently attached to tool bar 10 and the exchange of the previously used toolholder for the subsequently used toolholder is finished. The cutting operation of cutting tool 26 of the next toolholder then starts.

From the foregoing description, it will be understood that according to the present invention, the exchange of one toolholder 15 for another is accomplished by the use of one reciprocal vertical movement of tool bar 10. Therefore, the tool exchange operation can be very quick.

In the above-described embodiment of the automatic tool change machine tool, the draw bar received in tool bar 10 is provided with a male engagement means comprised of projection 31 and flange 32, and each toolholder 15 is provided with a female engagement means comprised of recess 29 formed in the top of conical tapered part 28. Alternatively, as can easily be conceived by persons skilled in the art, an appropriate female engagement means can be provided for the draw bar and the corresponding male engagement means can be provided for each toolholder 15.

FIGS. 4 through 7 illustrate a variant of the assembly of the tool bar and the draw bar, which may be used in place of the assembly of tool bar 10 and the draw bar of FIGS. 1 through 3. In FIGS. 4 through 7, the same reference numerals as those in FIGS. 1 through 3 indicate the same elements as those used for the automatic tool change machine tool of FIGS. 1 through 3.

Referring to FIGS. 4 through 7, tool bar 48 receives therein draw bar 50 which can be vertically moved by an actuating cylinder means (not shown in FIGS. 4 through 7). Tool bar 48 has formed at the lower part thereof counterbore part 49 in which cylindrical receipt element 51 having a central through-hole 52 is seated. Element 51 is fixed to tool bar 10 by means of screw 53. To the lowermost end of tool bar 48, annular retainer ring 54 having the same outer shape as the lower part of the tool bar 10 is fixed by means screw bolts 56.

Figures 4, 5:
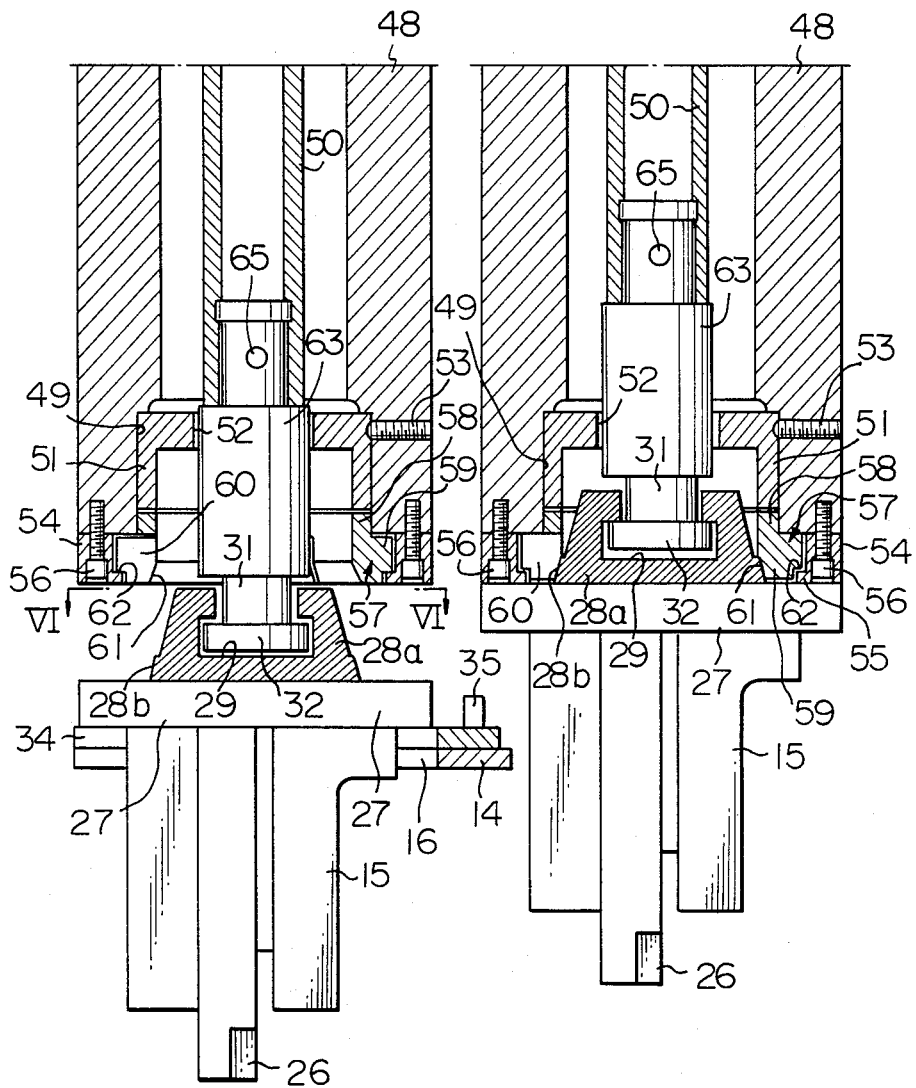
FIG. 4 is a partial cross-sectional view of a variant of a tool bar adapted for being accommodated in the machine tool of FIG. 1.
FIg. 5 is a similar view to FIG. 4, illustrating a state where a toolholder is attached to the tool bar.
Figure 6:
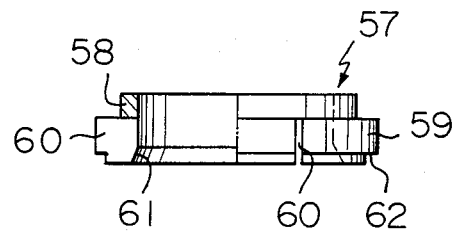
FIG. 6 is a front view, in part cross-section, of a centering ring element assembled in the tool bar of FIGS. 4 and 5.
Figure 7:
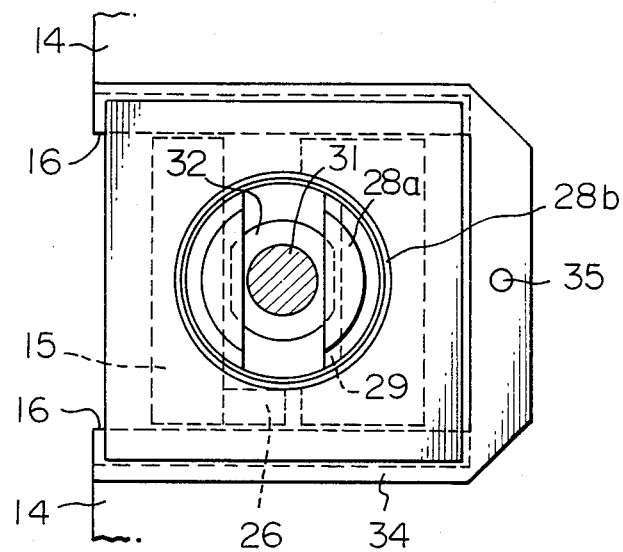
FIG. 7 is a view taken along the line VI—VI of FIG. 4.

Annular retainer ring 54 is provided at its inner lowermost end with annular extension 55. Centering ring 57 is arranged inside annular retainer ring 54. Centering ring 57 has upper small diameter part 58 and lower large diameter part 59 which is formed with three equiangularly arranged slits 60. Centering ring 57 is provided at the inner lowermost end with tapered part 61 formed as a downwardly divergent frustom face. Further, centering ring 57 is formed with step 62 at the outer lowermost part of large diameter part 59. Step 62 of centering ring 57 is seated against the annular extension of annular retainer ring 54, as illustrated in FIGS. 4 and 5. That is, centering ring 57 is held by retainer ring 54 at the lowermost end of tool bar 48. At this stage, it should be noted that small diameter part 58 of centering ring 57 is fitted in counterbore 49 of tool bar 48.

Draw bar 50 has lower element 63 connected to the lower part thereof by means of connecting pin 65. Lower element 63 is formed with projection 31 and flange 32 which are used as the male engagement means capable of being engaged with the female engagement means comprised of dovetail groove 29 of toolholder 15. Toolholder 15, for holding cutting tool 26, has the same structure as that of the toolholder in the embodiment of FIGS. 1 through 3, except that conical tapered part 28a is provided with enlarged tapered face 28b at the lower part of thereof. This enlarged tapered face 28b is complementary with but slightly larger than tapered face 61 of centering ring 57.

Toolholder 15 is usually stored in receptacle 16 of magazine 14 by means of toolholder support 34 (FIG. 7) having short upward pin 35. FIG. 4 illustrates a state where toolholder 15 is stored in magazine 14 at the tool change position immediately under tool bar 48.

FIG. 5 illustrates a state where toolholder 15 is attached to tool bar 48. That is, toolholder 15 is drawn upwardly by draw bar 3 so that tapered face 28b is snugly fitted in the complementary tapered face 61 of centering ring 57 of tool bar 48. At this stage, since tapered face 28b of toolholder 15 is larger than tapered face 61 of centering ring 47, large diameter part 59 of centering ring 57 is forced to spread outwardly and tightly clamps toolholder 15. Further, extension 27 of toolholder 15 is abutted against the lowermost end face of retainer ring 54. As a result, toolholder 15 is ensured to accurately and stably attach to tool bar 48 at each tool exchange operation. Accordingly, during the cutting operation of toolholder 15 having cutting tool 26, no appreciable fluctuating movement of toolholder 15 occurs even with a considerably heavy cutting load applied to cutting tool 26. Employment of the assembly of tool bar 48 and draw bar 50 consequently raises the accuracy in the cutting operation and increases the reliability of the automatic tool change machine tool.

Although the constructions, operations, and effects of the preferred embodiments of the automatic tool change machine tool have been described, it is to be understood that various modifications and variations may be made.

We claim:

1. An automatic tool change machine tool comprising:

a machine bed;

a worktable mounted on the machine bed;

a vertical column mounted on said machine bed and having a tool stock disposed at an upper part of said vertical column;

a vertically moveable tool bar received in said tool stock having at a lower part thereof means for receiving a toolholder, said toolholder receiving means being provided at the lowermost part thereof with a tool receiving bore having a conical tapered face;

a draw bar vertically movably arranged in said tool bar for pulling a toolholder toward and releasing the toolholder from said receiving means of said tool bar, said draw bar having at the lowermost end thereof a toolholder engagement means;

a magazine in the shape of an annular plate turnably mounted on said vertical column so as to be turnable about a vertical axis in a horizontal plane, said magazine having a plurality of toolholder receptacles arranged in the outer circumference thereof;

a plurality of toolholder supports, each being retractably arranged on each said toolholder receptacle and having a retraction permitting means at an inner base portion of each said toolholder supports, each of said toolholder supports being a plate-like fork member having parallel prongs interconnected with one another by an inner base portion;

a plurality of toolholders each holding a cutting tool and removably stored in said toolholder receptacles of said magazine, each said toolholder having a lateral extension means engageable with the corresponding toolholder support arranged on said toolholder receptacle, an upper tapered part capable of being complementary fitted in said tool receiving bore of said toolholder receiving means of said tool bar, and an engagement means capable of being engaged with said toolholder engagement means of said draw bar;

an indexing means for indexing each of said plurality of receptacles of said magazine to a predetermined tool change position where a toolholder is attached to or detached from said toolholder receiving means of said tool bar; and an actuating means for actuating the retraction of each said toolholder support from a corresponding receptacle and the pushing of each said toolholder support onto a corresponding receptacle while the corresponding receptacle of said toolholder magazine is indexed to said predetermined tool change position, said actuating means including an extendable and retractable piston rod having at the outermost part a recessed portion engageable with said retraction permitting means when said piston rod is in an extended position.

2. An automatic tool change machine tool according to claim 1, wherein each of the plurality of said receptacles of said magazine is a quadrilateral aperture formed in the outer periphery of said annular plate and wherein said lateral extension means of each said toolholder is shaped as a quadrilateral extension smaller than said quadrilateral aperture of said magazine.

3. An automatic tool change machine tool according to claim 2, wherein said toolholder engagement means of said draw bar comprises a vertical projection provided for the lower part of said draw bar so as to be downwardly projected from the lowermost end of said tool bar and a flange formed at the lowermost end of said projection and wherein said engagement means of each said toolholder comprises a dovetail recess formed in the top of said upper tapered part, said dovetail recess being sized so as to permit said projection and said flange of said draw bar to enter into and come out of said recess when said toolholder magazine is rotated around said vertical axis.

4. An automatic tool change machine tool according to claim 3, wherein said indexing means comprises a drive motor attached to a part of said vertical column; a pinion connected to and rotated by said drive motor; a toothed ring attached to said magazine and engaged with said pinion, and a rotation detecting device detecting the amount of rotation of said pinion and generating rotation detection signals for controlling the operation of said drive motor.

5. An automatic tool change machine tool according to claim 1, further comprising a lateral drive means for moving said vertical column in a lateral direction on said machine bed, said lateral drive means comprising a drive motor, a lateral feed screw connected to and rotated by said drive motor, and a threaded nut attached to said vertical column and engaged with said lateral feed screw.

6. An automatic tool change machine tool according to claim 1, wherein said indexing means comprises a drive motor attached to a part of said vertical column; a pinion connected to and rotated by said drive motor; a toothed ring attached to said magazine and engaged with said pinion, and a rotation detecting device detecting the amount of rotation of said pinion and generating rotation detection signals for controlling the operation of said drive motor.

7. An automatic tool change machine tool comprising:
   a machine bed;
   a worktable mounted on the machine bed;
   a vertical column mounted on said machine bed and having a tool stock disposed at an upper part of said vertical column;
   a vertically moveable tool bar received in said tool stock having at a lower part thereof means for receiving a toolholder;
   a draw bar vertically moveably arranged in said tool bar for pulling a toolholder toward and releasing the toolholder from said receiving means of said tool bar, said draw bar having at the lowermost end thereof a toolholder engagement means;
   a magazine in the shape of an annular plate turnably mounted on said vertical column so as to be turnable about a vertical axis in a horizontal plane, said magazine having a plurality of toolholder receptacles arranged in the outer circumference thereof;
   a plurality of toolholder supports, each being retractably arranged on each said toolholder receptacle and having a retraction permitting means at an inner base portion of each said toolholder supports, each of said toolholder supports being a plate-like fork member having parallel prongs interconnected with one another by an inner base portion;
   a plurality of toolholders each holding a cutting tool and removably stored in said toolholder receptacles of said magazine, each said toolholder having a lateral extension means engageable with the corresponding toolholder support arranged on said toolholder receptacle, an upper tapered part capable of being fitted in said toolholder receiving means of said tool bar, and an engagement means capable of being engaged with said toolholder engagement means of said draw bar;
   an indexing means for indexing each of said plurality of receptacles of said magazine to a predetermined tool change position where a toolholder is attached to or detached from said toolholder receiving means of said tool bar; and
   an actuating means attached to said vertical column for actuating the retraction of each said toolholder support from a corresponding receptacle and the pushing of each said toolholder support onto a corresponding receptacle while the corresponding receptacle of said toolholder magazine is indexed to said predetermined tool change position, said actuating means including an extendable and retractable piston rod having at the outermost part a recessed portion into which said retraction permitting means is able to come out when said piston rod is in an extended position, said tool holder receiving means comprising a centering ring element, having therein an inner tapered face complementary with and smaller than said upper tapered part of each of said plurality of said toolholders and having a plurality of slits formed in its wall, and a retaining ring, for holding said centering ring element at the lowermost part of said tool bar, said centering ring element being able to clamp said toolholder when each said toolholder is attached to said toolholder receiving means.

8. An automatic tool change machine tool according to claim 7, wherein each of the plurality of said receptacles of said magazine is a quadrilateral aperture formed in the outer periphery of said annular plate and wherein said lateral extension means of each said toolholder is shaped as a quadrilateral extension smaller than said quadrilateral aperture of said magazine.

9. An automatic tool change machine tool according to claim 8, wherein said toolholder engagement means of said draw bar comprises a vertical projection provided for the lower part of said draw bar so as to be downwardly projected from the lowermost end of said tool bar and a flange formed at the lowermost end of said projection and wherein said engagement means of each said toolholder comprises a dovetail recess formed in the top of said upper tapered part, said dovetail recess being sized so as to permit said projection and said flange of said draw bar to enter into and come out of said recess when said toolholder magazine is rotated around said vertical axis.

10. An automatic tool change machine tool according to claim 9, wherein said indexing means comprises a drive motor attached to a part of said vertical column; a pinion connected to and rotated by said drive motor; a toothed ring attached to said magazine and engaged with said pinion, and a rotation detecting device detecting the amount of rotation of said pinion and generating rotation detection signals for controlling the operation of said drive motor.

11. An automatic tool change machine tool according to claim 7, further comprising a lateral drive means for moving said vertical column in a lateral direction on said machine bed, said lateral drive means comprising a drive motor, a lateral feed screw connected to and rotated by said drive motor, and a threaded nut attached to said vertical column and engaged with said lateral feed screw.

12. An automatic tool change machine tool according to claim 7, wherein said indexing means comprises a drive motor attached to a part of said vertical column; a pinion connected to and rotated by said drive motor; a toothed ring attached to said magazine and engaged with said pinion, and a rotation detecting device detecting the amount of rotation of said pinion and generating rotation detection signals for controlling the operation of said drive motor.

13. An automatic tool change vertical lathe comprising:
   a machine bed;
   a rotatable worktable mounted on the machine bed for holding a workpiece thereon;
   a vertical column mounted on said machine bed and having a tool stock disposed at an upper part of said vertical column;
   a vertically movable tool bar received in said tool stock having at a lower part thereof tool holder receiving means for receiving a toolholder;
   a draw bar vertically movably arranged in said tool bar for pulling a toolholder toward and releasing the toolholder from said receiving means of said tool bar, said draw bar having at the lowermost end thereof a toolholder engagement means;
   a magazine in the shape of an annular plate turnably mounted on said vertical column so as to be turnable about a vertical axis in a horizontal plane, said magazine having a plurality of toolholder receptacles arranged in the outer circumference thereof;

a plurality of toolholder supports, each being retractably arranged on each said toolholder receptable and having a retraction permitting means at an inner base portion of each said toolholder supports;

each of said toolholder supports comprising a plate-like fork member having parallel prongs interconnected with one another by an inner base portion to which a short upward pin is attached as said retraction permitting means and wherein said actuating means includes an extendible and retractable piston rod having at the outermost part a recessed portion into which said short upward pin is able to come when said piston rod is in an extended position;

a plurality of toolholders each holding a cutting tool and removably stored in said toolholder receptacles of said magazine, each said toolholder having a lateral extension means engageable with the corresponding toolholder support arranged on said toolholder receptacle, an upper tapered part capable of being fitted in said toolholder receiving means of said tool bar, and an engagement means capable of being engaged with said toolholder engagement means of said draw bar;

said toolholder receiving means being provided at the lowermost part thereof with a tool receiving bore having a conical tapered face complementary with said upper tapered part of each of the plurality of said toolholders;

an indexing means for indexing each of said plurality of receptacles of said magazine to a predetermined tool change position where a toolholder is attached to or detached from said toolholder receiving means of said tool bar;

an actuating means attached to said vertical column for actuating the retraction of each said toolholder support from a corresponding receptacle and the pushing of each said toolholder support onto a corresponding receptacle while the corresponding receptacle of said toolholder magazine is indexed to said predetermined tool change position; and a lateral drive means for moving said vertical column in a lateral direction toward and away from said worktable on said machine bed, said lateral drive means comprising a drive motor, a lateral feed screw connected to and rotated by said drive motor, and a threaded nut attached to said vertical column and engaged with said lateral feed screw.

14. An automatic tool change machine tool according to claim 13, wherein each of the plurality of said receptacles of said magazine is a quadrilateral aperture formed in the outer periphery of said annular plate and wherein said lateral extension means of each said toolholder is shaped as a quadrilateral extension smaller than said quadrilateral aperture of said magazine.

15. An automatic tool change vertical lathe comprising:

a machine bed;

a rotatable worktable mounted on the machine bed for holding a workpiece thereon;

a vertical column mounted on said machine bed and having a tool stock disposed at an upper part of said vertical column;

a vertically movable tool bar received in said tool stock having at a lower part thereof tool holder receiving means for receiving a toolholder;

a draw bar vertically movably arranged in said tool bar for pulling a toolholder toward and releasing the toolholder from said receiving means of said tool bar, said draw bar having at the lowermost end thereof a toolholder engagement means;

a magazine in the shape of an annular plate turnably mounted on said vertical column so as to be turnable about a vertical axis in a horizontal plane, said magazine having a plurality of toolholder receptacles arranged in the outer circumference thereof;

a plurality of toolholder supports, each being retractably arranged on each said toolholder receptable and having a retraction permitting means at an inner base portion of each said toolholder supports;

each of said toolholder supports comprising a plate-like fork member having parallel prongs interconnected with one another by an inner base portion to which a short upward pin is attached as said retraction permitting means and wherein said actuating means includes an extendible and retractable piston rod having at the outermost part a recessed portion into which said short upward pin is able to come when said piston rod is in an extended position;

a plurality of toolholders each holding a cutting tool and removably stored in said toolholder receptacles of said magazine, each said toolholder having a lateral extension means engageable with the corresponding toolholder support arranged on said toolholder receptacle, an upper tapered part capable of being fitted in said toolholder receiving means of said tool bar, and an engagement means capable of being engaged with said toolholder engagement means of said draw bar;

said toolholder receiving means comprising a centering ring element having therein an inner tapered face complementary with and smaller than said upper tapered part of each of the plurality of said toolholders;

an indexing means for indexing each of said plurality of receptacles of said magazine to a predetermined tool change position where a toolholder is attached to or detached from said toolholder receiving means of said tool bar;

an actuating means attached to said vertical column for actuating the retraction of each said toolholder support from a corresponding receptacle and the pushing of each said toolholder support onto a corresponding receptacle while the corresponding receptacle of said toolholder magazine is indexed to said predetermined tool change position; and a lateral drive means for moving said vertical column in a lateral direction toward and away from said worktable on said machine bed, said lateral drive means comprising a drive motor, a lateral feed screw connected to and rotated by said drive motor, and a threaded nut attached to said vertical column and engaged with said lateral feed screw.

16. An automatic tool change machine tool according to claim 15, wherein each of the plurality of said receptacles of said magazine is a quadrilateral aperture formed in the outer periphery of said annular plate and wherein said lateral extension means of each said toolholder is shaped as a quadrilateral extension smaller than said quadrilateral aperture of said magazine.

* * * * *